Patented Nov. 22, 1949

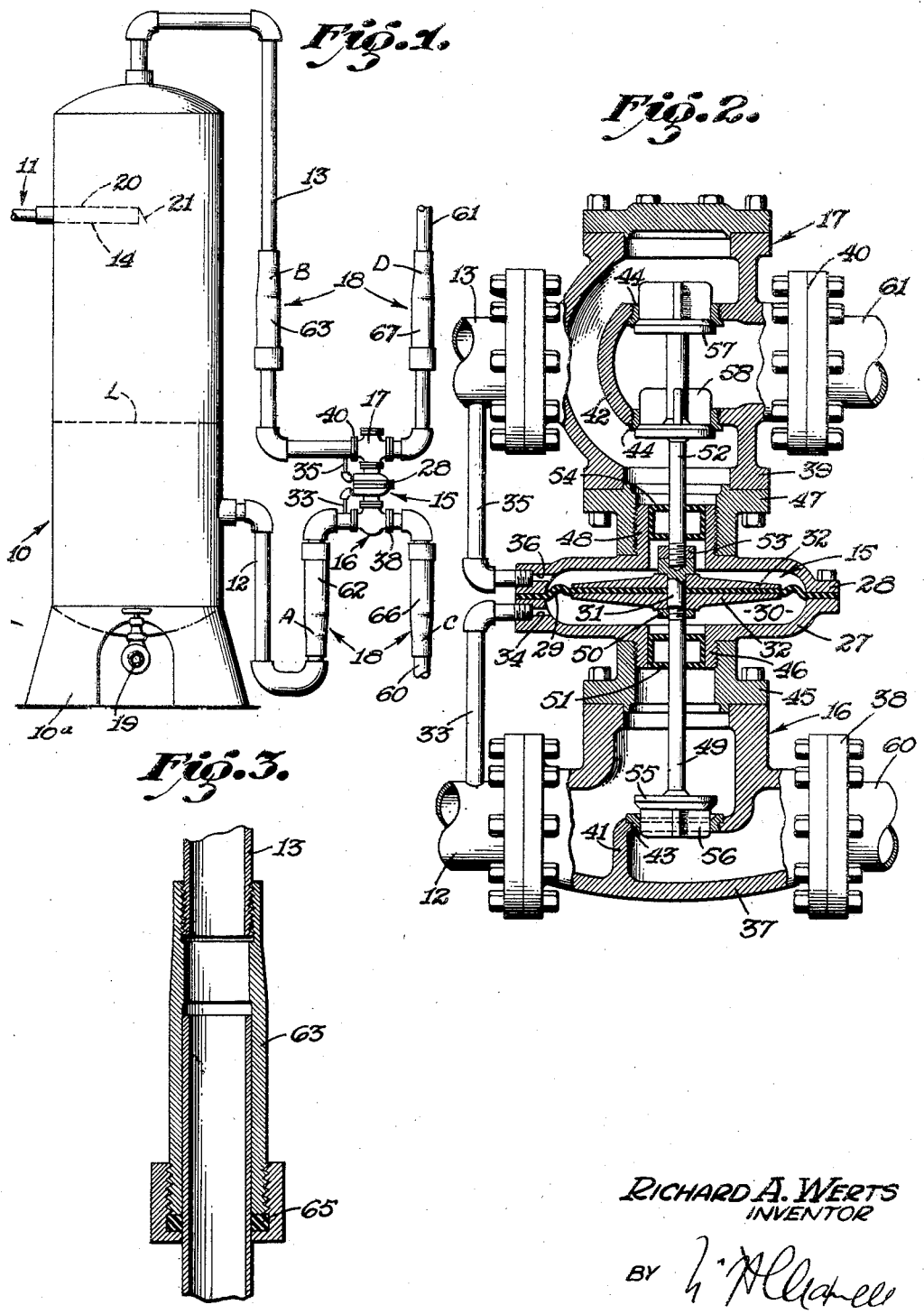
Nov. 22, 1949 — R. A. WERTS — 2,488,841
APPARATUS FOR HANDLING FLOW FROM WELLS
Filed Nov. 13, 1944

2,488,841

UNITED STATES PATENT OFFICE 2,488,841

APPARATUS FOR HANDLING FLOW FROM WELLS

Richard A. Werts, Long Beach, Calif., assignor of one-third to Elwin B. Hall and one-third to Arthur L. Armentrout Application November 13, 1944, Serial No. 563,232

8 Claims. (Cl. 183—2.7)

My invention relates to apparatus for handling flow from wells and is concerned with or related to devices commonly known as gas traps or separators. The invention has more particular reference to gas and liquid separators employed in connection with oil wells for separating the gas and oil as the fluids come from the well. A general object of the invention is to provide apparatus such as I have referred to which is practical, dependable and effective in operation.

This application is filed as a continuation in part of my copending application Serial No. 448,571, filed June 26, 1942, now abandoned, entitled "Separator," and is to take the place thereof.

Gas and liquid separators are employed in many industries and situations. A typical example is the gas trap or separator widely used in the oil fields to separate the gas from the oil or liquid as the fluid is produced from the well. In such devices there is a tank or separation chamber in which the gas separates from the oil and the discharge of the gas and oil from the separation chamber is controlled to maintain the desired liquid level in the chamber. The float mechanisms are subjected to rapid wear and deterioration and are not satisfactory because the float is sensitive to the disturbances at the liquid surface with the result that the valves are almost constantly fluctuating between open and closed positions. Other level controls have been proposed and employed but these usually involve complicated mechanisms in the separation chamber or complicated linkages at the exterior of the chamber and are often subject to inaccuracies because the valves are unbalanced and affect the action of the float, diaphragm or other level responsive means.

Another object of this invention is to provide a separator in which the level controller is in the form of a single compact unit entirely external of the separation chamber. The liquid level controller of the present invention is a single unit which may be most advantageously arranged at the exterior of the separation tank where it is readily accessible and where it is not subject to the wearing and deteriorating action of the constantly disturbed fluid within the tank.

Another object of this invention is to provide a separator of the character mentioned in which a relatively small rise of the actual liquid level in the tank produces substantial or full opening movement of the valve in the liquid discharge line, thus reducing to a minimum the erosive action of the solid matter during its passage through the valve.

Another object of this invention is to provide an oil and gas separator in which the level controller is unaffected by minor surface disturbances of the liquid in the tank but accurately reflects and responds to the actual head of liquid in the tank.

Another object of this invention is to provide an oil and gas separator of the character mentioned that does not embody or require extensive or complicated linkage subject to failure, wear, etc., and which are usually the source of inaccuracies and maladjustments.

Another and important object of this invention is to provide a separator of the character referred to embodying a liquid level controller whose action is unaffected by the variable back pressures in either the gas or oil discharge lines and which does not require the maintenance of an outside-actuating fluid pressure for its operation, thus allowing the separator to operate at the lowest possible pressure resulting in the maximum recovery of gas and subsequently of gasoline. It has been proposed in the prior art to employ diaphragms to control the gas and oil discharge lines but owing to the variable back pressures in these lines, such diaphragm controls have not proved practical or successful. In the mechanism of the present invention there is a single diaphragm acted on by the gas pressure in the separator and by the liquid head pressure actually present in the separation chamber and there are individual valves controlled by the diaphragm governing the flow of oil and gas to the discharge lines. The oil valve is normally held closed by the liquid head pressure while the gas valve is a balanced valve not subject to uncertain action due to variable back pressures that may exist in the gas discharge line. Back pressures in the discharge lines do not affect the action of the diaphragm, with the result that the controller acts with precision to maintain a substantially uniform liquid level in the separator.

Another object of this invention it to provide a separator of the character referred to in which the normally working parts require no adjustment, regulation or manual setting and in which there are no parts that can be tampered with or inaccurately manipulated to affect its operation.

Another object of my invention is to provide a simple, effective and accurate means of adjusting the action of the apparatus so that any desired liquid level can be maintained in the separator chamber without individually varying or adjusting the valves.

The various objects and features of my invention will be fully understood from the following detailed description of a typical preferred form and application of the invention, throughout which description reference is made to the accompanying drawings, in which:

Fig. 1 is a side elevation of a unit of apparatus embodying the invention. Fig. 2 is an enlarged vertical detailed sectional view of the level controller unit showing the parts in the position where liquid is being discharged from the separation chamber and Fig. 3 is an enlarged fragmentary vertical detailed sectional view illustrating one of the slip joints or adjustable connections provided between the separation chamber and the level control unit.

The apparatus of the present invention may be said to comprise, generally, a separating tank 10 receiving flow from a fluid inlet line 11, a liquid discharge line 12 and a gas discharge line 13, means 14 for handling the flow entering the tank 10 to minimize foam, a level controller comprising a diaphragm means 15 and liquid and gas discharge valves 16 and 17, respectively, operated by the diaphragm means 15, and adjusting means 18 for the level controller.

The tank 10 serves to receive the flow, which is a mixture of oil and gas, from a well or a group of wells and is a pressure-tight vessel in which the separation of the gases from the liquid occurs. As illustrated, the tank 10 is a vertically disposed elongate vessel supported by a suitable base 10ᵃ. The fluid inlet line 11 carrying the oil and gas to be separated enters the upper portion of the tank 10 at a point preferably well above the liquid level L. The oil discharge line 12 communicates with the lower portion of the tank 10 at a point spaced between its bottom and the liquid normal or average level L, while the gas discharge line 13 communicates with the upper end portion of the tank. A valve controlled drain line 19 communicates with the lower end of the tank 10 to permit the draining away of solid matter that settles from the liquid. It is to be observed that the tank 10 is a very simple structure and does not house or require mechanical linkages, internal valves, or the like.

The means 14 utilizes the energy of the incoming fluid to break up the foam bubbles which tend to form on the liquid surface in the tank 10 as a result of the gas coming out of solution. The means 14 operates to direct the incoming fluid downwardly against the foam or liquid surface in the tank in such a manner that it breaks the bubbles and thus destroys the foam and increases the separation rate of the separator. The separator being without a float or any other liquid level control mechanism within the tank 10, it is possible to effectively direct the incoming fluid downwardly by the means 14 to break up the foam without interfering with the proper operation of the separator.

The means 14 includes a tubular portion or nipple 20 on the inlet line 11 extending or projecting into the upper portion of the tank 10. The nipple 20 may be larger in diameter or capacity than the line 11 and its inner end is open for the discharge of the fluid. A deflector or baffle 21 is provided at the inner end of the nipple 20. The baffle 21 is secured at its upper end to the nipple 20 and projects downwardly and inwardly at an angle so that the fluid discharging from the nipple 20 strikes the baffle to be deflected downwardly thereby. The form and disposition of the baffle 21 are such that the incoming fluid under pressure is fanned out and directed downwardly in the form of a broad stream. It has been found that this fanned out stream of the incoming fluid effectively breaks down the foam that otherwise tends to collect on the surface of the liquid in the tank 10.

The level controller which is an important feature of the invention is preferably a single compact unit entirely external of the tank 10. The controller operates automatically and precisely in response to the actual liquid head to maintain the correct relationship between the oil and gas discharge and thus maintain a substantially uniform or stable liquid level in the tank. The level controller includes the diaphragm means 15 which is directly acted upon by the head pressure of liquid in the tank 10 to move in response to any appreciable change in the level of the liquid in the tank.

The diaphragm means 15 includes a diaphragm casing 27 made up of upper and lower sections secured together at their margins by flange and bolt connections 28. A flexible diaphragm 29 extends through or across the diaphragm chamber 30 and has its marginal portion secured between the flanges of the connection 28. The diaphragm 29 has a central hub 31 which carries diaphragm supporting discs 32. The discs 32 engage with the opposite sides of the diaphragm 29 to give stability to the major central portion of the diaphragm but the discs are proportioned to leave a substantial portion of the diaphragm free to flex.

In accordance with the invention one side of the diaphragm 29 is subjected to the gas pressure existing within the tank 10 and the other side of the diaphragm is subjected to the head pressure of the liquid in the tank plus the gas pressure. A pipe or line 33 extends from the liquid discharge line 12 to the diaphragm means 15 where it communicates with a port 34 formed in the wall of the diaphragm casing 27. The port 34 communicates with the lower portion of the diaphragm chamber 30 so pressure from the line 12 acts on the lower side of the diaphragm. A similar line 35 communicates with the gas discharge line 13 and extends to the diaphragm means 15 where it communicates with a port 36 which has communication with the upper portion of the diaphragm chamber 30 so pressure in the line 13 which corresponds to the gas pressure in the tank 10 acts on the upper side of the diaphragm. As illustrated, it is preferred to arrange the diaphragm means 15 adjacent to the tank 10 and in a horizontal plane below the normal or intended liquid level L.

With the structure thus far described it will be seen that the diaphragm 29 is at all times subjected to head pressure from liquid in the tank and to gas pressure corresponding to that in the tank.

The valves 16 and 17 control the flow from lines 12 and 13 to discharge lines 60 and 61, respectively, and are preferably directly connected with the diaphragm means 15 to be directly operated or controlled thereby. In the preferred construction the valve 17 is of the balanced type so that the action of the diaphragm 29 is unaffected by variations in the back pressures in the gas discharge line 61. The valve 16 may be an ordinary or simple valve arranged between the line 12 and liquid discharge line 60. Valve 16 is installed so that the liquid head pressure normally tends to hold it closed. The lines 33 and 35 connect with the lines 12 and 13, respectively, so that the lines 33 and 35 are always in free or full communication with the upper and lower portions, respectively, of the tank 10.

The valve 16, as shown in the drawings, includes a valve body 37 connected between the lines 12 and 60 by flange and bolt connections 38. A partition 41 is provided in the valve body to separate its upstream and downstream sides. The partition 41 has an opening through it equipped with a seat 43. The seat 43 opens or faces upward or in the direction of the upstream side of the valve. A stem 49 enters the valve body 37 from its upper end and carries a valve head 55 which cooperates with the seat 43. The valve head has projecting guide wings 56 slidably fitting the seat. The arrangement is such that the valve head 55 moves downward into engagement with the seat and the head pressure of liquid handled by the valve normally tends to hold the valve closed or in engagement with the seat.

The valve 17 is a balanced valve and handles the gas from the separator. The valve 17 includes a body 39 connected between the lines 13 and 61 by flange and bolt connections 40. The body of the valve includes a partition 42 which carries vertically spaced downwardly faced valve seats 44 and divides the interior of the body so that gas admitted from line 12 tends to flow down through the uppermost seat and up through the lowermost seat while gas passing the seats flows from the space between the two seats to the line 61.

A stem 52 enters the body 39 from its lower end and carries valve heads 57 which cooperate with the seats 44 so that they are moved upwardly into seating engagement with the seats and seat simultaneously. The valve heads have projecting guide wings 58 slidably fitting the seats 44. The construction just referred to and which is clearly illustrated in Fig. 2 is a typical balanced valve construction in which the pressures exerted by the gas controlled by the valve and by the back pressures acting on the valve are balanced.

In accordance with the preferred arrangement the valves 16 and 17 are secured together or are joined with or by the diaphragm means 15 so that the two valves and the diaphragm constitute a single, compact unit or pressure control.

The valves 16 and 17 may be associated or connected with the diaphragm means 15 in any selected or preferred manner. I prefer to arrange the diaphragm between the two valves so the valve 16 is immediately below the diaphragm while valve 17 is immediately above the diaphragm. In the case illustrated the body 37 of the valve 16 has a bonnet 45 threaded with a boss 46 on the lower side of the diaphragm casing 27 and the body 39 of the valve 17 has a similar bonnet 47 threaded with a boss 48 on the upper side of the diaphragm casing. This construction rigidly connects the two valves 16 and 17 with the diaphragm means 17 and maintains the two valves in vertical alignment.

Stem 49 is threaded with the diaphragm hub 31 and is locked thereto by a nut 50. The stem extends downwardly through a sealing or packing means 51 in the boss 46 and extends into the valve 16. Stem 52 is threaded with the upper end of the diaphragm hub 31 and is locked with the hub by a nut 53. The stem 52 extends through a packing or sealing means 54 in the boss 48 and projects up into the valve 17.

In practice the delivery of the fluid to the tank 10 through the line 11 may be continuous, fluctuating or interrupted. The liquid entering the tank falls to the bottom of the tank and the gas rises from the liquid and occupies the upper portion of the tank. The means 14 serves to dissipate or break down the foam that may tend to gather on the top of the liquid. The fluid discharging through the nipple 20 strikes the baffle 21 and is deflected downwardly in the form of a heavy fan shaped spray or stream which strikes the bubbles or foam to break the same and release the gas. This increases the rate of the separating action of the apparatus.

Assuming that valve 16 is closed and valve 17 is open, gas is free to discharge from line 13 into line 61, but the oil or liquid is retained in the tank 10. The weight of the diaphragm 29, diaphragm discs 32, the valve stems 49 and 52 and the valve heads 55 and 57, and the head pressure of the liquid on the valve head 55, act to normally hold the valve 16 closed and the valve 17 open until the liquid head acting on the diaphragm 29 overbalances these forces. The downward pressure tending to close valve 16 may be varied by adding a weight to the movable parts or, if desired, a spring may be employed to urge the assembly downward. Variation in the weight of the assembly or in the strength of any spring that may be used will vary the height of the normal liquid L. Such variations or adjustments of the apparatus may be made so they are not subject to improper manipulation or operation.

As the liquid collects in the tank 10 the liquid level L rises and the head pressure or hydrostatic pressure of the column of liquid in the tank 10 increases. This pressure is communicated to the under side of diaphragm 29 through line 12 and the line 33 and to the upper side of the valve 16. When the hydrostatic pressure created by the column of liquid in the tank 10 reaches a given value it overcomes or overbalances the gravity of the diaphragm assembly, stems 49 and 52 and heads 55 and 58, the head pressure on the valve 16 (which is the weight of the liquid plus the gas pressure on the liquid in the tank), and the gas pressure on the upper side of the diaphragm. When this occurs the liquid pressure moves the diaphragm 29 up and the interconnected valve heads and stem assemblies also move up, bringing heads 57 against their seats 44 to close the valve 17 and raising the head 55 from seat 43 to open the valve 16.

Upon opening of valve 16 the oil or liquid discharges from line 12 to line 60 and while this is occurring the line 13 may remain closed or partially closed. This results in the building up of gas pressure in the upper portion of the tank 10 to act against the body of liquid in the tank and is sufficient to discharge the oil or liquid against any usual back pressure there may be in the line 60. Thus, the separator is operable to discharge the liquid or oil against back pressures without employing outside fluid pressures or power means.

When the liquid level L falls substantially the hydrostatic pressure of the liquid column is appreciably reduced so that the pressure on the upper side of valve 16 and the under side of diaphragm 29 is lessened. When the weight of the diaphragm, the valve stems, and the valve heads, the pressure tending to close valve 16, and the gas pressure on the upper side of the diaphragm, overbalance the upward pressure on the diaphragm, the diaphragm moves downwardly and the head 55 closes onto its seat 43 while heads 57 move away from seats 44. When this occurs the discharge of the oil or liquid is cut off or reduced, while the discharge of the gas under pressure is initiated or increased. Under these circumstances, the liquid again collects in the tank 10 and the liquid level L rises. The above operations are automatically repeated. It is to be understood that in actual operation the level controller may serve to maintain the liquid level L within a desired range in the tank throughout an extended period of time and regardless of fluctuations in the flow or mixture delivered by pipe 11.

From the foregoing description it will be apparent that the action of the valves, for instance the opening of valve 16 and closing of valve 17, is governed mainly by a combination of two principal factors, namely, the weight tending to normally close valve 16 and open valve 17, and the head pressures acting on the diaphragm and valve 16. It will be apparent that the weight factor remains constant and therefore the point at which the valve 16 opens occurs when the liquid level in the tank 10 reaches a certain point or height in the tank relative to the position of the control unit at the exterior of the tank. In accordance with my present invention the means 18 is provided for effecting adjusting so that the apparatus can be readily set or adjusted to cause valve 16 to open when the liquid level L reaches any desired point in the tank 10.

The means 18 provides, generally, for varying the vertical relationship of the level control unit and the tank 10. Since the tank 10 is a large bulky unit while the level control comprising the valves and the diaphragm is a relatively small unit it is advantageous, in practice, to provide for movement of the control unit relative to the tank.

The means 18 contemplates, broadly, vertical adjustment of the level control relative to the tank 10. This movement or adjustment may, in practice, be accomplished through various mechanical arrangements. In the construction illustrated the means 18 is in the form of slip joints provided in the lines 12 and 13 and in discharge lines 60 and 61, where they are provided to receive flow from the apparatus.

To provide for the adjusting means the pipes 12 and 13 have parallel sections A and B, respectively, preferably vertically disposed, as shown in the drawings. A slip joint 62 is provided in section A of pipe 12 while a slip joint 63 is provided in section B of pipe 13.

The slip joints may be of any suitable construction. For instance, as shown in the drawings, they may involve telescoping parts provided with packing means 65 that can be tightened to maintain fluid tight connections. It is to be understood, of course, that the slip joints may be so arranged and proportioned as to give the control unit the desired vertical range of movement.

In the case illustrated in the drawings a discharge pipe 60 is provided to carry liquids or oil from the apparatus while a pipe 61 is provided to carry the gas from the apparatus. When pipes such as 60 and 61 are provided they have sections C and D arranged parallel with each other and with the sections A and B of pipes 12 and 13, respectively. In order to allow for free movement or adjustment of the level control slip joints 66 and 67 similar to the slip joints 62 and 63 are provided in the pipe sections C and D, respectively, as clearly shown in Fig. 1.

With the construction hereinabove described the packing means of the several slip joints may be tightened to not only make the joints tight but also to create friction so that the liquid level control unit comprising the valves and diaphragm remains in a fixed or set position. When it is desired to vary the level of the liquid at which the valve 16 opens the packing means of the several slip joints can be loosened, whereupon the level control unit can be bodily moved either up or down. It is to be noted that the pipe connections 33 and 35 are so related to the slip joints 62 and 63, that is, are connected into the pipes 12 and 13, by the slip joints and the valves so that they are not disturbed by adjustment of the level control unit.

It is important to note that a relatively small rise in the liquid level L will bring about complete opening of the valve 16. I prefer to use relatively small valves 16 and 17 to obtain maximum valve movement in relation to the liquid level change. For example, a liquid level rise of only 3/8 of an inch will result in full opening movement in a one inch liquid discharge valve 16. As a result of this the valve head 55 of the valve 16 is moved a substantial distance away from its seat 43 upon only minor changes in the liquid level L. Accordingly, the valve head 55 does not remain only "cracked" or in close proximity to its seat 43 while the liquid level is rising. The ratio between the liquid level change and the valve movement is such that there is no tendency for the valve head 55 to assume a position where it is in close proximity to its seat 43, in which latter positions the fluid would increase in velocity as it flows past the valve and the solid matter carried by the fluid would tend to cut out the valve head 55 and seat 43. In the apparatus of the invention a relatively small increase in the liquid in the tank 10 produces substantial opening movement of the valve head 55 providing ample openings for the discharge of the liquid and reducing to a minimum the erosive action of the solid matter carried by the discharging fluid. In this case it should be observed that the diaphragm 29 of large diameter multiplies the effective liquid head or pressure which opens the valve 16 and it should be further observed that the coupled valves 16 and 17 are simultaneously urged to one position by the gravity of their connected stems and heads and gravity of the diaphragm assembly and are simultaneously urged to the other position by the liquid pressure acting on the under side of the diaphragm 29. The liquid pressure acting on the under side of the diaphragm 29 is opposed by the weight of the diaphragm assembly and the valve stem and head assemblies, the head pressure on valve 16 and the gas pressure on the diaphragm. The gas pressure acting on the liquid in the tank 10 to increase the head pressure and on the upper side of the diaphragm 29 balance one another.

It is important to note that the diaphragm 29 which serves to control the two valves 16 and 17 is entirely unaffected by back pressures in the discharge lines 60 and 61. As above described, the back pressures in the lines do not move the movable elements of the valves. The diaphragm 29 operates in response to the actual pressure conditions existing within the tank 10 and is wholly unaffected by back pressures in the lines 60 and 61 and it controls the valves 16 and 17 with great accuracy or precision to maintain the required condition in the tank 10 at all times. The operation is entirely automatic and is not subject to adjustment or regulation except for the general adjustment above described. The apparatus is such that there is no possibility of incorrect adjustment on the part of the operators. There is no exposed linkage and there are no moving parts within the tank 10.

Having described only a typical preferred form and application of my invention, I do not wish to be limited or restricted to the specific details herein set forth, but wish to reserve to myself any variations or modifications that may appear to those skilled in the art or fall within the scope of the following claims.

Having described my invention, I claim:

1. A control means for oil and gas separators comprising in combination a substantially balanced gas control valve adapted to be incorporated in the gas outlet from a separator, an oil control valve adapted to be incorporated in the oil outlet from the separator, means directly connecting said valves whereby when the gas valve opens the oil valve will correspondingly close and vice-versa, and pressure responsive means subjected on opposite sides to the pressures in the gas outlet and oil outlet respectively and operatively connected to said valves to open and close said valves in accordance with the differential in pressure effective thereon.

2. A control means for oil and gas separators comprising in combination a substantially balanced gas control valve adapted to be incorporated in the gas outlet from a separator, an oil control valve adapted to be incorporated in the oil outlet from the separator, means directly connecting said valves whereby when the gas valve opens the oil valve will correspondingly close and vice-versa, and pressure responsive means subjected on opposite sides to the pressures in the gas outlet and oil outlet respectively and operatively connected to said valves to open and close said valves in accordance with the differential in pressures effective thereon, said valves being biased into a position wherein the gas valve is open and the oil valve is closed.

3. A control means for oil and gas separators comprising in combination a substantially balanced gas control valve adapted to be incorporated in the gas outlet from a separator, an oil control valve adapted to be incorporated in the oil outlet from the separator, means directly connecting said valves whereby when the gas valve opens the oil valve will correspondingly close and vice-versa, and a housed diaphragm between said valves exposed on that side facing the gas control valve to pressure in the gas outlet from the separator and exposed on that side facing the oil control valve to pressure in the oil outlet from the separator whereby the differential in pressures in said outlets is effective to open and close said valves respectively.

4. A control means for oil and gas separators comprising in combination a substantially balanced gas control valve adapted to be incorporated in the gas outlet from a separator, an oil control valve adapted to be incorporated in the oil outlet from the separator, means directly connecting said valves whereby when the gas valve opens the oil valve will correspondingly close and vice-versa, and a housed diaphragm between said valves exposed on that side facing the gas control valve to pressure in the gas outlet from the separator and exposed on that side facing the oil control valve to pressure in the oil outlet from the separator whereby the differential in pressures in said outlets is effective to open and close said valves respectively, said valves being biased into a position wherein the gas valve is open and the oil valve is closed.

5. A control means for oil and gas separators comprising a substantially balanced gas control valve adapted to be incorporated in the gas outlet from the separator, an oil control valve adapted to be incorporated in the oil outlet from the separator, a diaphragm housing between the valves, a diaphragm therein, means rigidly connecting said valves through the diaphragm whereby when the gas valve is opened the oil valve is correspondingly closed and vice-versa, means connecting the gas outlet between the separator and the gas control valve to that side of the diaphragm housing most adjacent the gas control valve, and means connecting the oil outlet between the separator and the oil control valve with that side of the diaphragm housing most adjacent the oil control valve whereby the diaphragm is caused to actuate said valves in accordance with the differential in pressures effective thereon.

6. A control means for oil and gas separators comprising a substantially balanced gas control valve adapted to be incorporated in the gas outlet from the separator, an oil control valve adapted to be incorporated in the oil outlet from the separator, a diaphragm housing between the valves, a diaphragm therein, means rigidly connecting said valves through the diaphragm whereby when the gas valve is opened the oil valve is correspondingly closed and vice-versa, means connecting the gas outlet between the separator and the gas control valve to that side of the diaphragm housing most adjacent the gas control valve, and means connecting the oil outlet between the separator and the oil control valve with that side of the diaphragm housing most adjacent the oil control valve whereby the diaphragm is caused to actuate said valves in accordance with the differential in pressures effective thereon, said valves being biased into a position wherein the gas valve is opened and the oil valve is closed.

7. A floatless oil and gas separator comprising a tank into which a mixed oil and gas influent may be discharged, an oil outlet leading from the tank, a gas outlet leading from the tank, a substantially balanced valve controlling the gas outlet and located externally of the tank, a poppet type valve controlling the oil outlet and located externally of the tank, said valves being rigidly connected for operation in unison whereby opening of the gas outlet will correspondingly close the oil outlet and vice versa, and a diaphragm arranged between the valves and externally of the tank exposed on that side facing the gas valve to pressure in the gas outlet and exposed on the opposite side to pressure in the oil outlet, said valves being biased to close the oil outlet and open the gas outlet when pressures on opposite sides of the diaphragm are equal.

8. A unitary control for use with a liquid and gas separator having a separator chamber for receiving a liquid-gas mixture and in which are formed gas-containing and liquid-containing portions of the mixture comprising a normally open valve for controlling flow from the gas-containing portion of the chamber, a normally closed valve for controlling flow from the liquid-containing portion of the chamber, housing structures for said valves, diaphragm means having a housing structure assembled with said valve housing structures, and a diaphragm connected to move said valves simultaneously to open one and close the other, and conduit connections to said diaphragm means to conduct the fluid pressures in said gas and liquid-containing portions to said diaphragm means on opposite sides of said diaphragm.

RICHARD A. WERTS.

REFERENCES CITED

The following references are of record in the file of this patent:

UNITED STATES PATENTS

| Number | Name | Date |
|---|---|---|
| 428,399 | Moore | May 20, 1890 |
| 548,458 | Reynolds | Oct. 22, 1895 |
| 1,378,689 | Larson | May 17, 1921 |
| 1,428,375 | Humphreys | Sept. 5, 1922 |
| 1,620,096 | Harris | Mar. 8, 1927 |
| 1,691,350 | Harris | Nov. 13, 1928 |
| 1,941,030 | Williams | Dec. 26, 1933 |
| 1,993,790 | Kinsella | Mar. 12, 1935 |
| 2,145,114 | Gibbs | Jan. 24, 1939 |
| 2,167,160 | Raymond | July 25, 1939 |
| 2,313,797 | Bailey | Mar. 16, 1943 |